(12) United States Patent
Völkel et al.

(10) Patent No.: US 10,508,391 B2
(45) Date of Patent: Dec. 17, 2019

(54) CONSTRUCTION MACHINE

(71) Applicant: Hamm AG, Tirschenreuth (DE)

(72) Inventors: Werner Völkel, Neustadt (DE); Christian Eichhorn, Vohenstrauß (DE)

(73) Assignee: Hamm AG, Tirschenreuth (DE)

( * ) Notice: Subject to any disclaimer, the term of this patent is extended or adjusted under 35 U.S.C. 154(b) by 47 days.

(21) Appl. No.: 15/839,258

(22) Filed: Dec. 12, 2017

(65) Prior Publication Data
US 2018/0163350 A1    Jun. 14, 2018

(30) Foreign Application Priority Data

Dec. 14, 2016 (DE) .......................... 10 2016 124 341

(51) Int. Cl.
| | |
|---|---|
| *E01C 19/23* | (2006.01) |
| *E01C 19/26* | (2006.01) |
| *E02D 3/02* | (2006.01) |
| *E01C 19/48* | (2006.01) |
| *G08C 17/02* | (2006.01) |
| *E01C 19/28* | (2006.01) |

(Continued)

(52) U.S. Cl.
CPC ............ *E01C 19/236* (2013.01); *E01C 19/26* (2013.01); *E01C 19/282* (2013.01); *E01C 19/48* (2013.01); *E02D 3/026* (2013.01); *G01P 15/003* (2013.01); *G08C 17/02* (2013.01)

(58) Field of Classification Search
CPC ...... E01C 19/236; E01C 19/26; E01C 19/282; E01C 19/48; E01C 19/286; E02D 3/026
See application file for complete search history.

(56) References Cited

U.S. PATENT DOCUMENTS

| | | | | |
|---|---|---|---|---|
| 5,469,150 A | * | 11/1995 | Sitte ..................... | G05B 19/054 340/3.1 |
| 5,727,900 A | * | 3/1998 | Sandstrom ............ | E01C 19/288 404/122 |
| 9,222,226 B2 | * | 12/2015 | Villwock ................ | E02D 3/026 |

(Continued)

FOREIGN PATENT DOCUMENTS

| | | |
|---|---|---|
| DE | 20 2006 001 305 | 6/2006 |
| DE | 102007041512 | 3/2009 |

(Continued)

OTHER PUBLICATIONS

English translation of Japanese Office action dated Oct. 4, 2018 filed in Application No. 2017-239612.

(Continued)

*Primary Examiner* — Abigail A Risic
(74) *Attorney, Agent, or Firm* — Rankin, Hill & Clark LLP (57) ABSTRACT

A construction machine includes a system area rotatable about an axis of rotation with respect to a machine frame. On the rotatable system area is at least one sensor, a data transmission unit with at least one transmission antenna, and a first data transmission arrangement for transmitting data from the at least one sensor to the data transmission unit. On the machine frame is a data receiving unit with at least one receiving antenna, a data evaluation system, and a second data transmission arrangement for transmitting data from the data receiving unit to the data evaluation system. The data transmission unit has at least two transmission antennas and/or the data receiving unit has at least two receiving antennas.

10 Claims, 4 Drawing Sheets

(51) Int. Cl.
*E02D 3/026* (2006.01)
*G01P 15/00* (2006.01)

(56) References Cited

U.S. PATENT DOCUMENTS

| | | | | |
|---|---|---|---|---|
| 9,645,071 | B2* | 5/2017 | Pistrol | E01C 19/23 |
| 9,650,747 | B2* | 5/2017 | Villwock | E02D 3/039 |
| 2010/0042298 | A1* | 2/2010 | Haruyama | B60K 17/10 |
| | | | | 701/50 |
| 2013/0234507 | A1 | 9/2013 | Kim | |
| 2014/0341650 | A1* | 11/2014 | Villwock | E02D 3/026 |
| | | | | 404/117 |
| 2015/0101424 | A1* | 4/2015 | Villwock | E02D 3/039 |
| | | | | 73/865.8 |
| 2017/0159246 | A1* | 6/2017 | Pistrol | G01N 9/00 |

FOREIGN PATENT DOCUMENTS

| | | |
|---|---|---|
| DE | 102008049945 | 4/2009 |
| DE | 10 2011 088 567 | 6/2013 |
| DE | 202016101808 | 4/2016 |
| EP | 1 845 196 | 10/2007 |
| JP | 60-253693 | 12/1985 |
| JP | 2004238926 | 8/2004 |
| JP | 2004524154 | 8/2004 |
| JP | 200533335 | 2/2005 |
| JP | 2006250663 | 9/2006 |
| JP | 2007318557 | 12/2007 |
| JP | 2009087268 | 4/2009 |
| JP | 2011101485 | 5/2011 |
| JP | 2016121478 | 7/2016 |
| JP | 2016203834 | 12/2016 |

OTHER PUBLICATIONS

German Search Report filed in DE 10 2016 124 341.8 f dated Nov. 29, 2017.
European Search Report filed in EP 17206382 dated May 2, 2018.

* cited by examiner

CONSTRUCTION MACHINE

The present invention relates to a construction machine, for example, a soil compactor with at least one compressor roller which forms a system area of the construction machine or of the soil compactor that is rotatable with respect to a machine frame.

A construction machine designed in the form of a soil compactor with a compressor roller is known from DE 10 2011 088 567 A1. Multiple movement sensors designed as accelerometers are provided in the interior of the compressor roller distributed across the circumference. These transmit their output signals to a data transmission unit which is in radio connection with a data receiving unit provided on the machine frame, thus on a non-rotating system area of the construction machine, in order to be able to evaluate information provided by the movement sensors in a data evaluation system that is likewise provided on the machine frame. In an alternative embodiment, a respective data transmission unit, that is in radio connection with the data receiving unit for signal transmission, is assigned to each movement sensor.

It is the object of the present transmission to provide a construction machine in which a reliable, error-free transmission is guaranteed of information provided in a rotating system area to a data evaluation system provided in a non-rotating system area of the construction machine.

According to the invention, this problem is solved by the construction machine comprising:
  a system area rotatable about an axis of rotation with respect to a machine frame,
  on the rotatable system area: at least one sensor, a data transmission unit with at least one transmission antenna, and a first data transmission arrangement for transmitting data from the at least one sensor to the data transmission unit,
  on the machine frame: a data receiving unit with at least one receiving antenna, a data evaluation system, and a second data transmission arrangement for transmitting data from the data receiving unit to the data evaluation system,
wherein the data transmission unit has at least two transmission antennas and/or the data receiving unit has at least two receiving antennas.

As multiple transmitting antennas and/or multiple receiving antennas are used in the construction machine designed according to the invention in order to transmit or to receive the signal emitted by the data transmission unit and transmitted via radio, it is guaranteed that a reliable radio connection is established between at least one transmission antenna and at least one receiving antenna regardless of the rotational position of the rotatable system area of the construction machine. The risk of an interruption or of disturbance in the radio connection due to a distance that is temporarily too great between a transmission antenna and a receiving antenna because of the rotation of the rotatable system area may thus be eliminated.

According to another advantageous aspect of the present invention, which does not necessarily have to be combined with the previously mentioned aspect, in order to be able to guarantee the reliable transmission of large amounts of data between the at least one sensor and the data transmission unit or between the data receiving unit and the data evaluation system, it is proposed that the first data transmission arrangement comprises a first data bus system, and/or that the second data transmission arrangement comprises a second data bus system. In particular, it may be provided that the first data bus system and/or the second data bus system comprises a CAN data bus system. It is thereby particularly advantageous if the same bus systems are used both in the rotatable system area as well as in the area of the machine frame so that a conversion is not necessary for the data transmitted between the data transmission unit and the data receiving unit.

In order to guarantee a continuous and reliable radio connection between the data transmission unit and the data receiving unit regardless of the position of the rotatable system area, it is proposed that at least two transmission antennas and/or at least two receiving antennas are arranged preferably at an angular distance in the range from 90° to 180° to one another.

To provide comprehensive information about the movement state of the rotatable system area, a plurality of sensors designed as movement sensors may be provided preferably at uniform angular distances to one another.

The rotatable system area may be a compressor roller of a soil compactor.

At least one sensor designed as a movement sensor may be an accelerometer. Alternatively or additionally, in particular if the rotatable system area is a compressor roller, at least one sensor may be provided which provides information about the position and/or the movement of at least one unbalanced mass of an unbalanced mass arrangement. This type of unbalanced mass arrangement may, for example, be provided in a compressor roller in order to superimpose an oscillation movement, thus a periodic back and forth movement in the circumferential direction, and/or a vibrational movement, thus a periodic back and forth movement in the vertical direction, during the compacting operation of a compressor roller rotating about its axis of rotation. Alternatively or additionally, a temperature sensor may be provided, for example on or in a compressor roller, in order to provide information about the temperature in the interior of the rotatable system area or at its outer periphery.

In particular, if a data bus system is used for information transmission to the data transmission unit, it is proposed that at least one sensor is designed to emit a digital sensor signal.

To supply the components provided in the rotatable system area with electrical power, a direct voltage power supply arrangement may be provided. A reliable and efficient power transmission may thereby be provided from the non-rotating system area, thus from the area of the machine frame, into the rotating system area, for example in that the direct voltage power supply arrangement comprises an induction power transmission arrangement for wireless power transmission into the rotatable system area, wherein the induction power transmission arrangement comprises a transmission arrangement with at least one transmission coil and a receiving arrangement with at least one receiving coil at the rotatable system area.

In order to thereby be able to provide reliable power transmission essentially regardless of the rotational position of the rotatable system area, it is proposed that the receiving arrangement comprises a plurality of receiving coils preferably arranged following one another about the axis of rotation in the circumferential direction and/or that the transmission arrangement comprises at least two transmission coils arranged following one another about the axis of rotation in the circumferential direction.

In order to provide a system that is easy to integrate into a rotatable system area, it is proposed that the induction power transmission arrangement comprises a plurality of supports following one another in the circumferential direction, wherein at least one receiving coil is provided on each support, and that at least one sensor is provided on at least one support, and/or the data transmission unit is provided on one support, and/or a transmission antenna is provided on at least one support, preferably on at least two supports.

Similarly, a reliable information transmission from the rotating system area into the non-rotating system area may be ensured in that a signal splitter is assigned to the data transmission unit for distributing the output signal of the data transmission unit to multiple transmission antennas in such a way that all transmission antennas transmit essentially the same output signal simultaneously and without interruption.

The present invention is subsequently described in detail with reference to the accompanying figures. As seen in.

Before the transmission of data from the rotation system area of the construction machine to a non-rotating area of the construction machine is subsequently described in detail with reference to FIGS. 5 and 6, it is initially described, by means of an example depicted with reference to FIGS. 1-4, how electrical power may be coupled into the rotating system area of a construction machine in order to be able to supply the components, arranged there for information detection and transmission, with electrical power.

Figure 1:
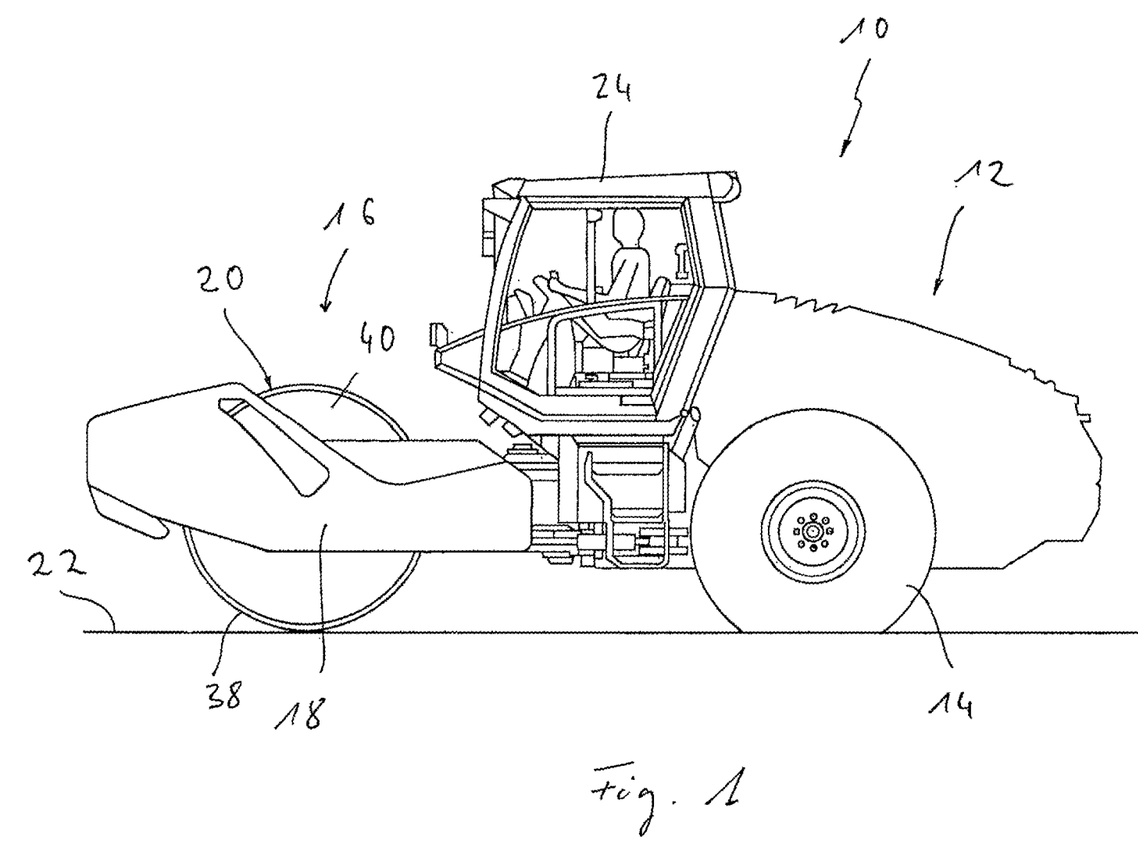
FIG. 1 a soil compactor.

The construction machine designed in the form of a soil compactor 10 is clear in a side view in FIG. 1. Soil compactor 10 comprises a rear vehicle 12 with drive wheels 14 driven by a drive unit also provided there. A front vehicle 16, pivotable with respect to rear vehicle 12, comprises a machine frame 18 on which a compressor roller 20 is rotatable about an axis of rotation essentially orthogonal to the drawing plane of FIG. 1 in order to compact a substrate 22 during forward movement of soil compactor 10. In the meaning of the present invention, machine frame 18 supporting compressor roller 20 and rear vehicle 12 are understood as components of the entire machine frame of soil compactor 10.

Different mechanisms may be provided in the interior of compressor roller 20 in order to generate an oscillational movement or a vibrational movement in addition to the rolling movement of the same. To detect the movement state of compressor roller 20, movement sensors, for example, accelerometers, are provided in the interior of said compressor roller which are connected to a data transmission unit in order to transmit information about the movement state of the compressor roller to a receiving unit arranged, for example, in the area of a driver cabin 24 on rear vehicle 12. The sensors arranged in the interior of compressor roller 20 or the data transmission unit are consumers of electrical power which must be supplied with electrical power to provide the sensor signals or for transmitting the same as radio signals.

It is subsequently described with reference to FIGS. 2-4 how these types of consumers of electrical power in a rotating system area, thus in compressor roller 20 of soil compactor 10 depicted by of example, may be supplied with electrical power according to the principles of the present invention.

Figure 2:
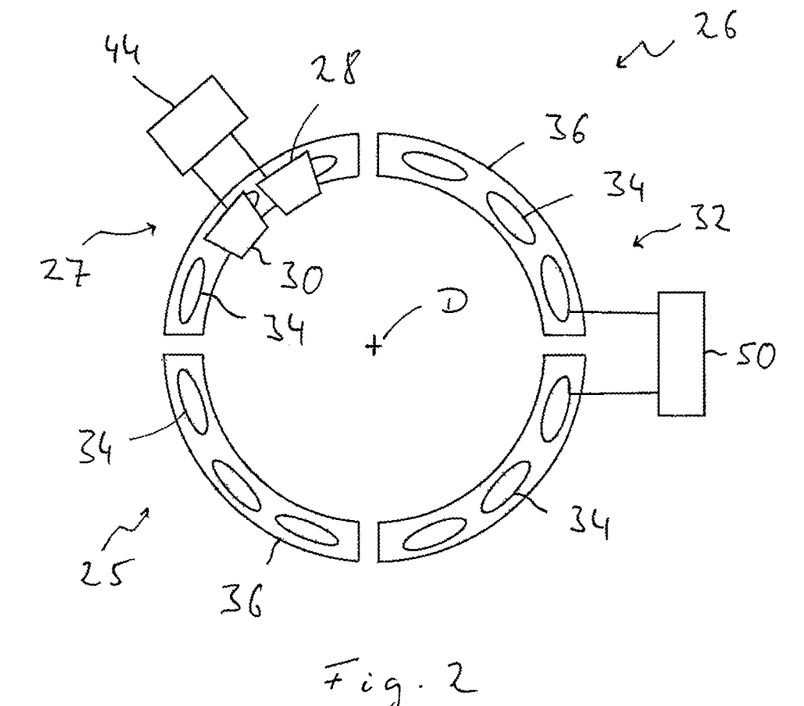
FIG. 2 an induction power transmission arrangement provided in assignment to a compressor roller of the soil compactor from FIG. 1 in a principle depiction.
Figure 3:
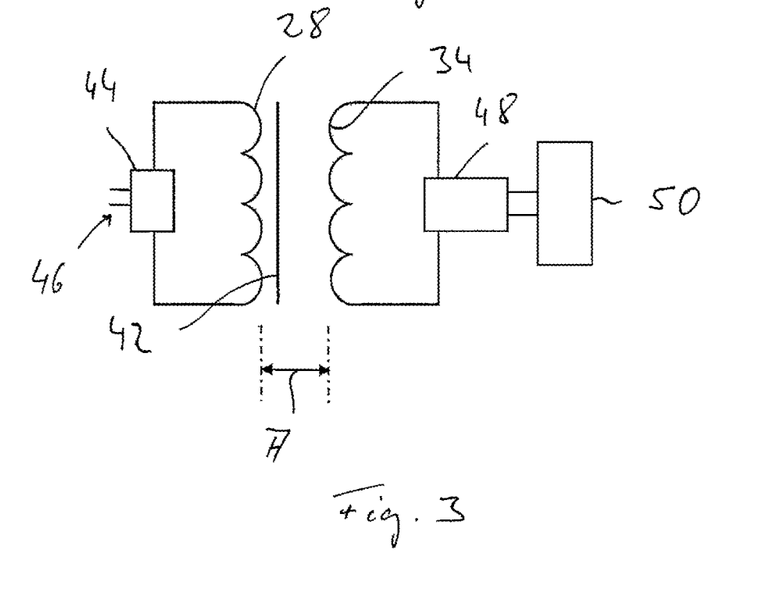
FIG. 3 the interaction of a transmission coil with a receiving coil in a principle depiction.
Figure 4:
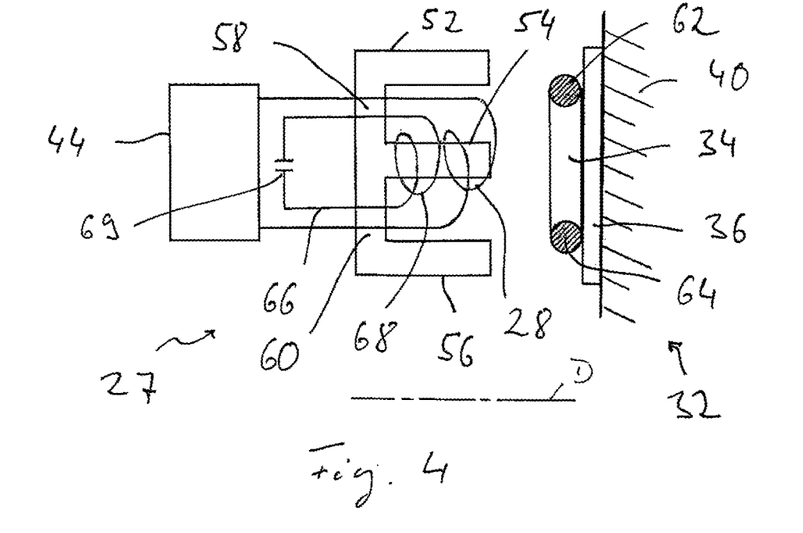
FIG. 4 the basic structure of the transmission arrangement with a transmission coil and a resonance circuit assigned to the same.

A direct voltage power supply arrangement 25, illustrated in the essentially principle depictions in FIGS. 2-4 in the form of an induction power transmission arrangement 26, comprises in the depicted example a transmission arrangement 27 with two transmission coils 28, 30. These are supported on a component, for example, fixed with respect machine frame 18, that does not rotate with the rotating system area, thus compressor roller 20. The two transmission coils 28, 30 may thereby be arranged such that they are arranged following one another in the circumferential direction about the axis of rotation of the rotatable system area, thus compressor roller 20.

On the rotating system area, thus in the depicted example of compressor roller 20, a receiving arrangement is provided designated generally with 32. This comprises a plurality of receiving coils 34 arranged following one another about axis of rotation D, for example, likewise in the circumferential direction, and designed as elongated in the circumferential direction. In the depicted example, three receiver coils 34 of this type are supported in each case on a support 36 designed like a circular segment. The in total four circular segment supports 36 may be fixed, in the circular configuration depicted in FIG. 2, on the rotating system area, thus compressor roller 20, for example, on a disk 40 connecting these axially and supporting a roller shell 38. Receiving coils 34 are arranged with respect to axis of rotation D in such a way that they lie approximately in those radial areas in which transmission coils 28, 30 are also positioned.

The interaction of receiving coils 34 with transmission arrangement 27 or with the two transmission coils 28, 30 of the same, is described with reference to FIGS. 3 and 4.

FIG. 3 shows, by way of example, transmission coil 28, which may have one or more windings surrounding a core 42 preferably made from a metal material and depicted schematically. Transmission coil 28 is in connection with a frequency generator 44 which may be connected to an input area 46 on the on-board voltage system of soil compactor 10 and may be supplied by this with, for example, a 12 volt direct voltage. Frequency generator 44 generates a high-frequency alternating voltage signal, e.g. with a frequency in the range of 100 kHz, from this direct voltage and applies this to transmission coil 28. This generates, amplified by core 42, a corresponding high-frequency magnetic alternating field, which induces a corresponding alternating voltage or a corresponding alternating current in receiving coil 34 lying opposite transmission coil 28 in FIG. 3. A rectifier 48, assigned to receiving coil 34, generates a direct voltage from this alternating voltage, for example, likewise 12 V, which may be applied to the consumer(s) of electrical power provided in compressor roller 20 in order to thus supply them with electrical power.

During rotation of compressor roller 20, receiving coils 34 move following one another in the circumferential direction successively past transmission coils 28, 30 at a distance A, maintained in the direction of axis of rotation D, of approximately 20 mm. During each phase, in which one or more of receiving coils 34 is/are in magnetic interaction with transmission coils 28, 30, an alternating voltage or an alternating current is generated in the affected receiving coils 34 by magnetic induction. As an autonomous rectifier 48 is provided in assignment to each receiving coil 34, and all receiving coils 34 or the assigned rectifiers 48 are switched parallel to one another, an essentially constant supply of consumers 50 is ensured even in rotational operation. The fact that transmission arrangement 27 comprises multiple, in the depicted example two, transmission coils 28, 30 following one another in the circumferential direction, which are each in excitation interaction with frequency generator 44 also contributes particularly to this purpose, so that the circumferential area, in which a magnetic interaction is generated between transmission arrangement 27 and receiving arrangement 32, is extended in such a way that at least one of receiving coils 34 is always excited by the magnetic alternating field to generate an alternating voltage.

FIG. 4 illustrates an example for the structure of transmission coils 28, 30, for example, of transmission coil 28 or its interaction with assigned core 42. This core 42, in general constructed from metal material, is E-shaped in the exampled depicted and has three legs 52, 54, 56 of the E and bars 58, 60 of the E respectively connecting the legs to one another. The one or multiple windings comprising transmission coil 28 are wound about the center leg of the E, thus leg 54 of the E. Core 42 is essentially arranged such that legs 52, 54, 56 of the E are oriented approximately in the direction of axis of rotation D and toward compressor roller 20 or receiving coils 34 provided thereon. Preferably, center leg 54 of the E surrounded by transmission coil 28 is thereby positioned in the radial direction so that it is positioned approximately centered between a radially outer coil area 62 and a radially inward coil 64 of a respective receiving coil 34. The two outer legs 52, 56 of the E may be positioned approximately opposite of these radially outer or radially inner coil areas 62, 64.

In this way, a very efficient magnetic interaction is guaranteed between transmission coil 28 and receiving coils 34, which move periodically past, wherein said receiving coils 34 comprise one or more windings not necessarily surrounding a core.

To increase the efficiency in the power transmission from transmission arrangement 27 to receiving arrangement 32, an electric resonance circuit 66 is provided respectively in assignment to each transmission coil 28, 30. This resonance circuit comprises a self-contained electric circuit with a resonance circuit coil 68 and a resonance circuit capacitor 69. Resonance circuit 66 thus has a resonance frequency essentially defined by the inductivity of resonance circuit coil 68 and the capacity of resonance circuit capacitor 69. Said resonance frequency essentially corresponds to the frequency of the alternating voltage applied at transmission coil 28 and provided by frequency generator 44. In order to be able to carry out a most exact synchronization, generator 44 may, for example, be synchronizable in its frequency in order to be able to carry out an adjustment to the resonance frequency of resonance circuit 66 by minor variation of its own frequency. Alternatively or additionally, resonance circuit capacitor 69 may also be variable, for example, in its capacity in order to adjust the resonance frequency of resonance circuit 66 to the frequency of the alternating voltage provided by frequency generator 44.

Resonance circuit coil 68, which surrounds core 42, may be positioned in close proximity to transmission coil 28. For example, these two coils may be arranged adjacent to one another contacting the same area of coil 42, thus surrounding center leg 54 of the E in the depicted example. Basically, one of the coils might also be arranged surrounding the other on its outer peripheral area so that a very compact structure may be achieved in the direction of the axis of rotation.

Upon applying the alternating voltage generated by frequency generator 44 to transmission coil 28, resonance circuit 66 is excited to vibrate, wherein, due to the previously discussed frequency synchronization of resonance circuit 66 to its resonance frequency, thus the resonance circuit is vibrated at very high amplitudes. This amplifies the magnetic alternating field generated by transmission coil 28. Due to the use of this type of resonance circuit 66 in assignment to a respective transmission coil 28 or 30, the efficiency of the induction power transmission arrangement may be increased to approximately 45% so that at a power consumption of frequency generator 44 of approximately 15 W, rectifiers 48 assigned to receiving coils 34 provide a power output of approximately 7 W.

Reference is made here to the fact that induction power transmission arrangement 26, depicted essentially in a principle configuration in particular in FIGS. 2-4, may be varied in various aspects. Thus, naturally more or also fewer receiving coils 34 than those depicted may be arranged following one another in the circumferential direction. Radially phased rings may also be provided by receiving coils 34 following one another in the circumferential direction, wherein these rings are preferably located offset to one another in the circumferential direction. The number of transmission coils of transmission arrangement 27 may also be varied, likewise the structure of the transmission coils or the cores interacting with the same. Thus, these cores do not necessarily have to be E-shaped. A U-shaped or an essentially semi-circular configuration of these cores may also be provided. The transmission coils may also be provided, for example, on one of the outer legs of the E on in a bar area connecting two legs of the E or two legs of the U.

Figure 5:
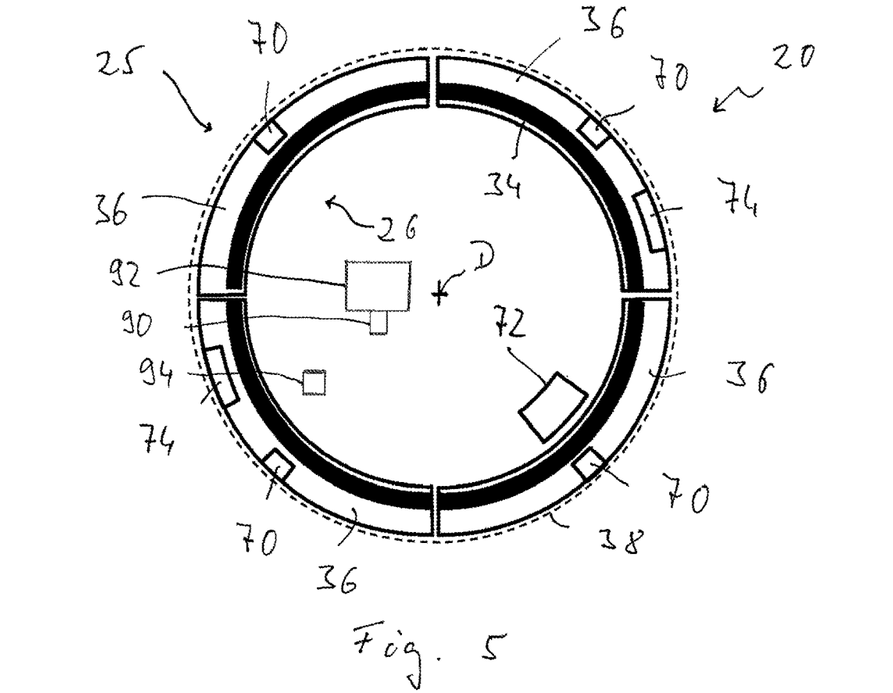
FIG. 5 a compressor roller of the soil compactor depicted in FIG. 1 in a principle axial view with the components provided thereon for providing and transmitting information to a non-rotating area of the soil compactor.

FIG. 5 shows compressor roller 20 in a principle axial view. Supports 36, previously described in detail, are provided on compressor roller 20 with receiving coils 34, only principally depicted in FIG. 5, of induction power transmission arrangement 26. In the example depicted in FIG. 5, a sensor, for example, a movement sensor 70 provided in the form of an accelerometer, is supported on each of supports 36. Furthermore, a data transmission unit, generally designated with 72, is provided on compressor roller 20 and which may be supported, for example, on one of carriers 36 or, for example supported in the interior of roller shell 38 supported on the same. A transmission antenna 74 is supported on two diametrically opposite supports 36 respectively, so that, as is quite clear in FIG. 5, the two transmission antennas have an angular distance of approximately 180° with respect to axis of rotation D.

As is subsequently described with reference to FIG. 6, movement sensors 70 are in data transmission connection with data transmission unit 72, which in turn is in connection with the two transmission antennas 74 in order to be able to guide the information provided by movement sensors 70 to a data evaluation system supported on a soil compactor 10 on its machine frame, for example, in the area of rear vehicle 12.

Figure 6:
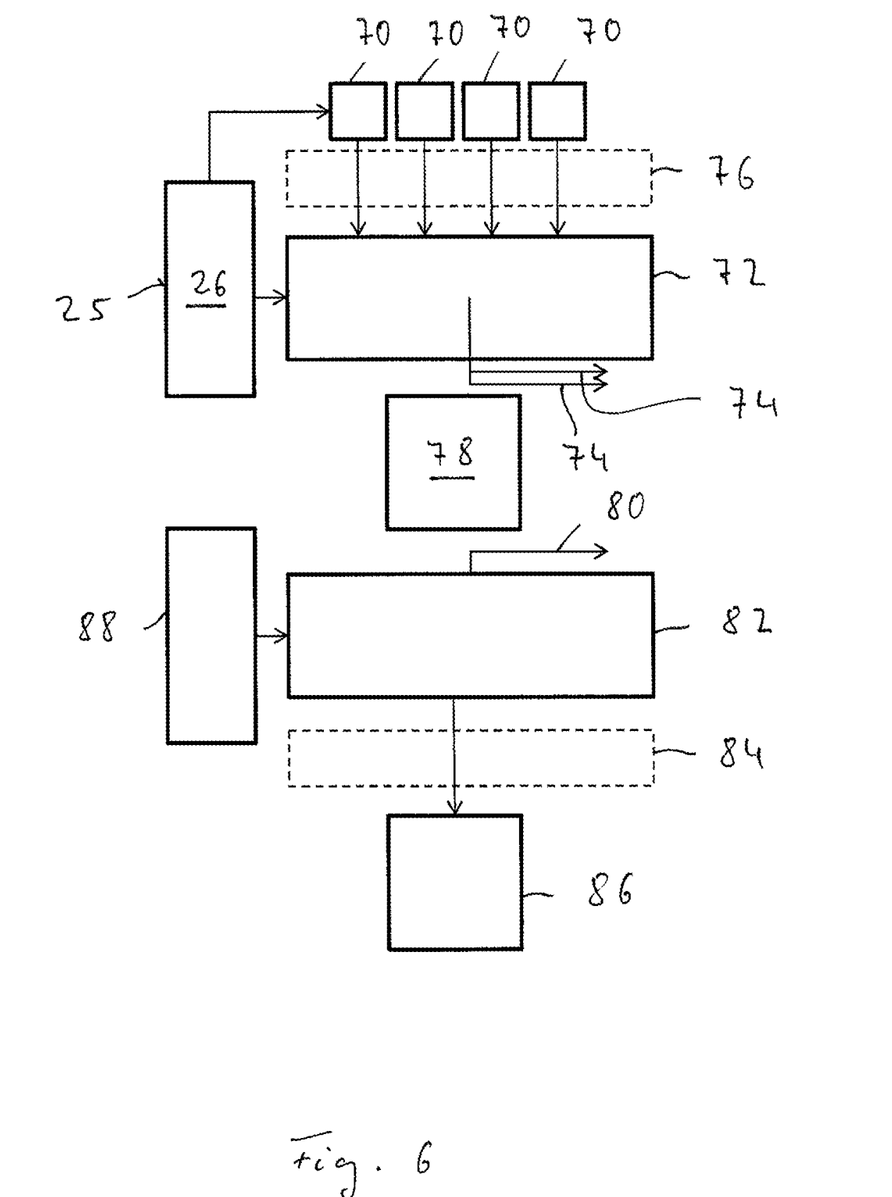
FIG. 6 a block diagram depiction of the system used in the soil compactor from FIG. 1 for transmitting information from the compressor roller to a data evaluation system provided on the machine frame of the soil compactor.

FIG. 6 shows four movement sensors 70 which are coupled for data transmission to data transmission unit 72 via a data bus system designated generally as 76. Data bus system 76 is preferably a CAN data bus system, which guides the information or the data, output by movement sensors 70 in digital form, to data transmission unit 72. In order to be able to provide the signals output by sensors 70 in digital form, a CAN transceiver, for example, may be assigned to each sensor 70, which basically converts detection signals provided in analog form into a suitable data format for transmission by data bus system 76 designed as a CAN data bus system. Both movement sensors 70 and also data transmission unit 72 are supplied with a direct voltage, for example, of 12 V, by direct voltage power supply arrangement 25 described previously in detail.

The data or signals received from data transmission unit 72 via data bus system 76 are distributed to the two transmission antennas 74 by data transmission unit 72 as signals suitable for radio transmission. For this purpose, a signal splitter may be assigned to data transmission unit 72 or may be integrated into the same, said signal splitter simultaneously and continuously applies the same signal to the two transmission antennas 74 so that the two transmission antennas 74 continuously transmit essentially the same output signal, thus in each case an output signal with the same informational content.

As is illustrated in a block 78, the radio transmission may be carried out by means of a modified Wi-Fi signal in a frequency range of approximately 2.49 GHz using a CAN data bus protocol and a data transmission rate of approximately 500 kbits/s. A receiving antenna 80 of a data receiving unit 82, positioned on soil compactor 10 close to compressor roller 20 on a non-rotating system area, for example, on machine frame 18, on an inner side of the same axially opposite compressor roller 20, receives the signals output by the two transmission antennas 74 and forwards them to a data evaluation system 86 via a data bus system 84. Data bus system 84 is also preferably designed as a CAN data buss system so that the signals received by data receiving unit 82 may be transmitted essentially without conversion into another data format to data evaluation system 86 via data bus system 84. Data receiving unit 82 may be supplied with electrical power, likewise like all components or assemblies provided on the non-rotating system area of soil compactor 10, from the on-board voltage system generally designated with 88.

The data received in data evaluation system 86 may then be evaluated for providing information about the movement state of compressor roller 20. Data evaluation system 86 may comprise, for example, a microcontroller which is programmed or designed to carry out the desired signal evaluation in combination with hardware and software.

As transmission antennas 74 are provided, arranged at a circumferential distance to one another in the rotating system area in the structure described with reference to FIG. 6, it is guaranteed that said transmission antennas 74, or at least one of them, periodically moving past receiving antennas 80 in the rotational operation of compressor roller 20, is in radio transmission connection with receiving antenna 80. Thus, regardless of the rotational position of compressor roller 20, a continuous data transmission connection may be guaranteed between data transmission unit 72 and data receiving unit 82 and thus a communication that is free of interruptions and errors.

Reference is made to the fact that transmission antennas 74 may also naturally be positioned at another angular position, for example at an angular distance of 90° to one another, and that, for example more than two of this type of transmission antennas may be arranged across the circumference distributed at a preferably uniform angular distance. In an alternative embodiment, multiple receiving antennas 80 arranged distributed across the circumference about axis of rotation D might by positioned at a uniform circumferential spacing, for example, on machine frame 18 in an area facing compressor roller 20, past which multiple receiving antennas, for example, a single transmission antenna moves in the rotational operation of compressor roller 20. In this way, a continuous and reliable radio transmission connection may also be ensured between the rotating system area and the non-rotating system area. Basically, more transmission antennas might also be provided on the rotating system area, and several receiving antennas might be provided on the non-rotating system area. In conjunction with the use of data bus systems for data transmission both in the rotating system area and also in the non-rotating system area, a reliable transmission of large amounts of data is thus guaranteed between the rotating system area and the non-rotating system area.

It is further illustrated in FIG. 5, that, alternatively or additionally to the sensors designed as movement sensors 70, other sensors may be provided on compressor roller 20. Thus, one or more sensors 90 may be provided, which provide information about the position and/or the movement of one or more unbalanced masses of an unbalanced mass arrangement, generally designated with 92, and provided in compressor roller 20. This unbalanced mass arrangement 92 may have unbalanced masses displaceable in rotation parallel to axis of rotation D or to concentric axes of rotation so that, in rotational operation of these types of unbalanced masses, an oscillational movement or a vibrational movement may be superimposed on the rotational movement of compressor roller 20. It is also possible to provide one or more temperature sensors 94 on or in compressor roller 20 in order to provide information about the temperature in the interior of compressor roller 20 or on the outer periphery thereof. Additional sensors, not explicitly depicted, which are able to detect and to transmit information, which is connected to the working operation of this type of compressor roller 20 or of a rotatable system area in general, may also be provided on or in the rotatable system area, in the depicted example compressor roller 20. These types of sensors may also be designed to emit a digital signal or may be coupled to analog/digital converters generating digital signals, in order to be able to transmit these signals to data evaluation system 86, as this is depicted in FIG. 6 with reference to movement sensors 70.

The invention claimed is:
1. A construction machine, comprising:
   a system area rotatable about an axis of rotation with respect to a machine frame,
   on the rotatable system area: at least one sensor, a data transmission unit with at least one transmission antenna, and a first data transmission arrangement for transmitting data from the at least one sensor to the data transmission unit,
   on the machine frame: a data receiving unit with at least one receiving antenna, a data evaluation system, and a second data transmission arrangement for transmitting data from the data receiving unit to the data evaluation system,
   wherein the data transmission unit has at least two transmission antennas and/or the data receiving unit has at least two receiving antennas,
   wherein a direct voltage power supply arrangement is provided for supplying the at least one sensor and the data transmission unit with electrical power,
   wherein the direct voltage power supply arrangement comprises an induction power transmission arrangement for wireless power transmission into the rotatable system area, wherein the induction power transmission arrangement comprises a transmission arrangement with at least one transmission coil and a receiving arrangement comprises at least one receiver coil on the rotatable system area.

2. The construction machine according to claim 1, wherein the first data transmission arrangement comprises a first data bus system and/or that the second data transmission arrangement comprises a second data bus system.

3. The construction machine according to claim 2, wherein the first data bus system and/or the second data bus system comprises a CAN data bus system.

4. The construction machine according to claim 1, wherein at least two transmission antennas and/or at least two receiving antennas are arranged at an angular distance in the range from 90° to 180° to one another.

5. The construction machine according to claim 1, wherein a plurality of sensors, designed as movement sensors, is provided at a uniform angular distance to one another.

6. The construction machine according to claim 1, wherein the rotatable system area is a compressor roller, and/or that at least one sensor, designed as a movement sensor, is an accelerometer, and/or that at least one sensor is a sensor for providing information about the position and/or the movement of an unbalanced mass of an unbalanced mass arrangement and/or that at least one sensor is a temperature sensor.

7. The construction machine according to claim 1, wherein at least one sensor is designed for emitting a digital sensor signal.

8. The construction machine according to claim 1, wherein the receiving arrangement comprises a plurality of receiving coils arranged following one another in the circumferential direction about the axis of rotation, and/or that the transmission arrangement comprises at least two transmission coils arranged preferably following one another in the circumferential direction about the axis of rotation.

9. The construction machine according to claim 8, wherein the induction power transmission arrangement comprises a plurality of supports following one another in the circumferential direction, wherein at least one receiving coil is provided on each support, and that at least one sensor is provided on at least one support, and/or the data transmission unit is provided on one support, and/or a transmission antenna is provided on at least one support.

10. The construction machine according to claim 1, wherein a signal splitter is assigned to the data transmission unit for distributing the output signal of the data transmission unit to multiple transmission antennas in such a way that all transmission antennas transmit essentially the same output signal simultaneously and without interruption.

* * * * *